(12) United States Patent
Eastoe et al.

(10) Patent No.: US 10,749,329 B2
(45) Date of Patent: *Aug. 18, 2020

(54) CONNECTION ASSEMBLY, SENSOR ASSEMBLY AND SUBSEA CABLE HARNESS

(71) Applicant: Siemens Aktiengesellschaft, Munich (DE)

(72) Inventors: Andrew Robert Eastoe, Urangsvaeg (NO); Bjoern-Aksel Haugland, Foldroeyhamn (NO); Hans Knutsson, Stord (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 247 days.

This patent is subject to a terminal disclaimer.

(21) Appl. No.: 15/776,114

(22) PCT Filed: May 23, 2016

(86) PCT No.: PCT/EP2016/061571
§ 371 (c)(1),
(2) Date: May 15, 2018

(87) PCT Pub. No.: WO2017/084769
PCT Pub. Date: May 26, 2017

(65) Prior Publication Data
US 2018/0331527 A1    Nov. 15, 2018

(30) Foreign Application Priority Data
Nov. 17, 2015 (EP) .................................. 15194944

(51) Int. Cl.
*H02G 15/013* (2006.01)
*E21B 33/038* (2006.01)
(Continued)

(52) U.S. Cl.
CPC ......... *H02G 15/013* (2013.01); *E21B 17/028* (2013.01); *E21B 33/0385* (2013.01);
(Continued)

(58) Field of Classification Search
CPC ........ H02G 15/013; H02G 15/22; H02G 9/02; H02G 15/14; H02G 15/117; H02G 15/003;
(Continued)

(56) References Cited

U.S. PATENT DOCUMENTS 4,689,440 A    8/1987  Morin
6,332,787 B1 * 12/2001  Barlow ............. H01R 13/5227
                                                439/138
(Continued)

FOREIGN PATENT DOCUMENTS

EP        0592782 A2     4/1994
WO    WO 2013172846 A1   11/2013

OTHER PUBLICATIONS

International Search Report PCT/ISA/210 for International Application No. PCT/EP2016/061571 dated Sep. 7, 2016.
(Continued)

*Primary Examiner* — Freddie Kirkland, III
(74) *Attorney, Agent, or Firm* — Harness, Dickey & Pierce, P.L.C.

(57) ABSTRACT

A connection assembly includes an adapter to be mounted to a rear part of a subsea sensor, a sensor port being located in the adapter, through which at least a first and a second sensor connection are led to the subsea sensor; a first port for providing a connection to a first of the subsea cables; and a second port for providing a connection to a second of the subsea cables. A first penetrator is arranged in the first port to provide a liquid tight seal between an interior space of the adapter and a duct connected to the first port leading the first (Continued)

sensor connection through the first port, and a second penetrator is arranged in the second port providing a liquid tight seal between the interior space of the adapter and a duct connected to the second port and leading the second sensor connection through the second port.

33 Claims, 4 Drawing Sheets

(51) Int. Cl.
| | |
|---|---|
| *G01D 11/24* | (2006.01) |
| *H01R 13/52* | (2006.01) |
| *H01R 13/533* | (2006.01) |
| *H01R 13/66* | (2006.01) |
| *H02G 15/22* | (2006.01) |
| *G01K 7/02* | (2006.01) |
| *H02G 9/02* | (2006.01) |
| *H02G 15/14* | (2006.01) |
| *E21B 17/02* | (2006.01) |
| *E21B 47/06* | (2012.01) |
| *G01K 1/14* | (2006.01) |
| *G01L 19/14* | (2006.01) |
| *H01B 7/00* | (2006.01) |
| *H01B 7/14* | (2006.01) |
| *H02G 15/117* | (2006.01) |
| *G01K 7/16* | (2006.01) |
| *H02G 15/00* | (2006.01) |

(52) U.S. Cl.
CPC ............ *E21B 47/06* (2013.01); *E21B 47/065* (2013.01); *G01D 11/245* (2013.01); *G01K 1/14* (2013.01); *G01K 7/023* (2013.01); *G01L 19/147* (2013.01); *H01B 7/0045* (2013.01); *H01B 7/14* (2013.01); *H01R 13/5216* (2013.01); *H01R 13/533* (2013.01); *H01R 13/6683* (2013.01); *H02G 9/02* (2013.01); *H02G 15/117* (2013.01); *H02G 15/14* (2013.01); *H02G 15/22* (2013.01); *G01K 2007/163* (2013.01); *H02G 15/003* (2013.01)

(58) Field of Classification Search
CPC .... G01K 7/023; G01K 1/14; G01K 2007/163; E21B 17/028; E21B 47/06; E21B 47/065; E21B 33/0385; G01L 19/147; H01B 7/0045; H01B 7/14; G01D 11/245; H01R 13/5216; H01R 13/533; H01R 13/6683
See application file for complete search history.

(56) References Cited

U.S. PATENT DOCUMENTS

| | | | | |
|---|---|---|---|---|
| 6,364,677 | B1* | 4/2002 | Nysveen | H02G 15/22 |
| | | | | 439/199 |
| 6,475,008 | B1* | 11/2002 | Marolda | H01R 13/523 |
| | | | | 439/271 |
| 8,100,715 | B2* | 1/2012 | Whitlock | H01R 24/38 |
| | | | | 439/580 |
| 10,096,406 | B2* | 10/2018 | Eastoe | H01B 17/305 |
| 10,240,425 | B2* | 3/2019 | Eastoe | E21B 33/0385 |
| 2015/0129300 | A1* | 5/2015 | Mansfield | G01F 1/8409 |
| | | | | 174/657 |

OTHER PUBLICATIONS

Written Opinion of the International Searching Authority PCT/ISA/237 for International Application No. PCT/EP2016/061571 dated Sep. 7, 2016.

* cited by examiner

CONNECTION ASSEMBLY, SENSOR ASSEMBLY AND SUBSEA CABLE HARNESS

PRIORITY STATEMENT

This application is the national phase under 35 U.S.C. § 371 of PCT International Application No. PCT/EP2016/061571 which has an International filing date of May 23, 2016, which designated the United States of America and which claims priority to European patent application number EP15194944.3 filed Nov. 17, 2015, the entire contents of which are hereby incorporated herein by reference.

FIELD

At least one embodiment of the invention generally relates to a connection assembly, sensor assembly and/or subsea cable harness for subsea use.

BACKGROUND

Subsea pressure and temperature sensors are known and are for example used to measure pressure or temperature at different locations on a subsea hydrocarbon production or processing facility, for example on a subsea Christmas tree or in a subsea flow line.

Conventional systems employ for example a single pressure sensor to which a single cable is connected. The cable provides data communication and power to the sensor. The sensor can for example be connected to a subsea control module.

SUMMARY

For reasons of achieving a safe and secure operation, two such pressure sensors can be provided to achieve redundancy. The inventors have discovered that the problem with such configurations is that they require a significant amount of space since each pressure sensor needs to be mounted on a different position on the flow line or on the Christmas tree. Further, such configurations are costly.

Thus, the inventors have discovered that there is a need for improving measurements in a subsea application.

This need is met by the features of the claims. Embodiments of the invention are described with regard to the claims.

According to an embodiment, a connection assembly for connecting at least two subsea cables, in particular oil filled hoses, to a dual output subsea sensor is provided. The connection assembly comprises:
  an adapter piece configured to be mounted to a rear part of the subsea sensor,
  a sensor port in the adapter piece through which at least a first sensor connection and a second sensor connection are led to the dual output subsea sensor,
  a first port for providing a connection to a first of the subsea cables,
  a second port for providing a connection to a second of the subsea cables,
  a first penetrator arranged in the first port, wherein the first penetrator provides a liquid tight seal between an interior space of the adapter piece and a duct connected to the first port, and wherein the first penetrator leads the first sensor connection through the first port, and
  a second penetrator arranged in the second port, wherein the second penetrator provides a liquid tight seal between the interior space of the adapter piece and a duct connected to the second port, and wherein the second penetrator leads the second sensor connection through the second port.

According to another embodiment, a sensor assembly comprises a dual output subsea sensor and a connection assembly according to an embodiment, wherein the connection assembly is mounted to the subsea sensor.

According to another embodiment, a subsea cable harness is provided. The subsea cable harness comprises a first subsea cable including electrical conductors for providing a first sensor connection, a second subsea cable including electrical conductors for providing a second sensor connection, and a connection assembly as described above. The first subsea cable is connected, directly or indirectly, to the first port of the connection assembly, and the second cable is connected, directly or indirectly, to the second port of the connection assembly. The first penetrator leads electrical conductors of the first sensor connection through the first port into an interior space of the adapter piece. The second penetrator leads electrical conductors of the second sensor connection through the second port into the interior space of the adapter piece. An indirect connection between the first subsea cable or second subsea cable and the first port or second port, respectively, may be provided by the above described mechanical interface and/or the first and second connection adapters, respectively. Additionally, a fitting, for example an MKII fitting, may be provided for indirectly connecting the first and/or second subsea cable to the corresponding port.

DETAILED DESCRIPTION OF THE EXAMPLE EMBODIMENTS

Figure 1:
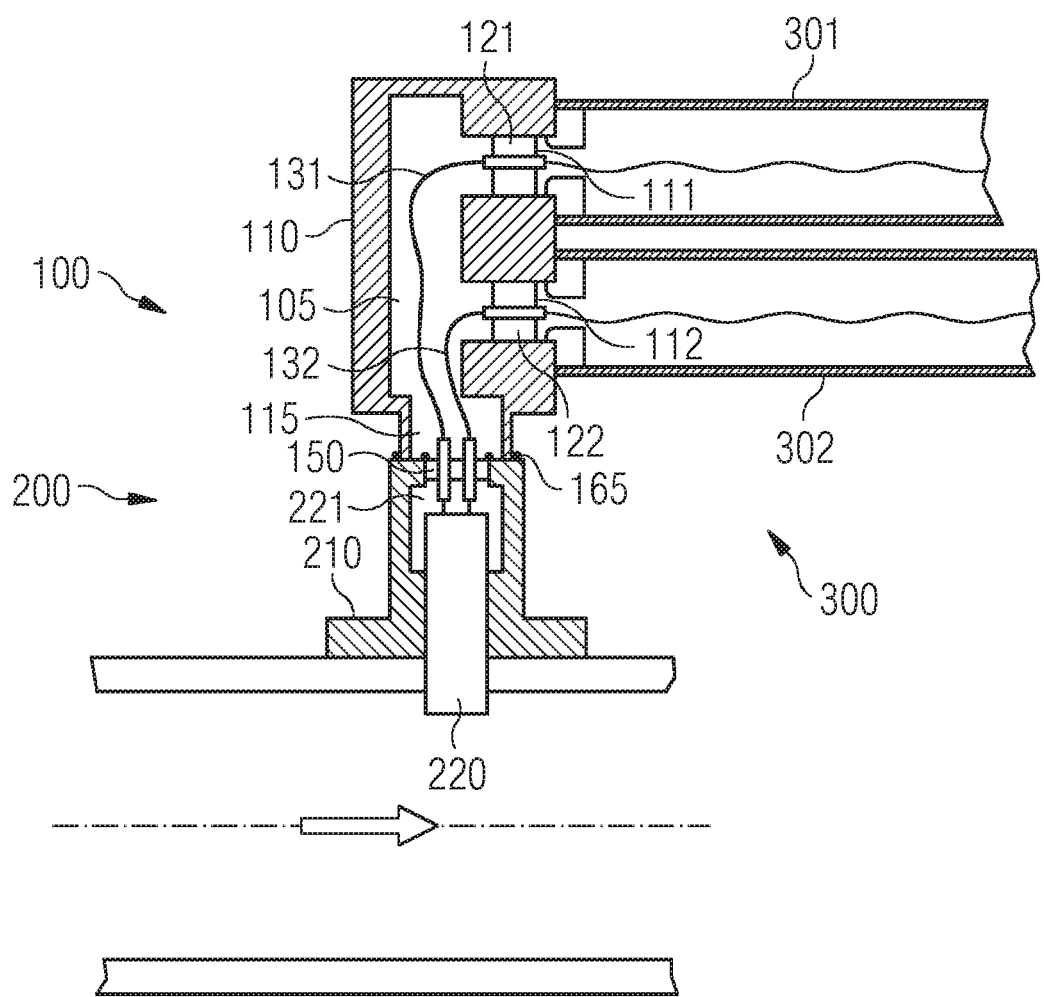
FIG. 1 shows a sectional side view of a subsea cable harness including a sensor assembly and connection assembly according to an embodiment of the invention.

According to an embodiment, a connection assembly for connecting at least two subsea cables, in particular oil filled hoses, to a dual output subsea sensor is provided. The connection assembly comprises:
  an adapter piece configured to be mounted to a rear part of the subsea sensor,
  a sensor port in the adapter piece through which at least a first sensor connection and a second sensor connection are led to the dual output subsea sensor,
  a first port for providing a connection to a first of the subsea cables,
  a second port for providing a connection to a second of the subsea cables,
  a first penetrator arranged in the first port, wherein the first penetrator provides a liquid tight seal between an interior space of the adapter piece and a duct connected to the first port, and wherein the first penetrator leads the first sensor connection through the first port, and a second penetrator arranged in the second port, wherein the second penetrator provides a liquid tight seal between the interior space of the adapter piece and a duct connected to the second port, and wherein the second penetrator leads the second sensor connection through the second port.

The sealing provided by the first penetrator and by the second penetrator may be such that there is no fluid communication between the duct connected to the first port and the duct connected to the second port through the adapter piece.

Such configuration requires only relatively little space since it becomes possible to employ a dual output sensor and to connect two subsea cables to such sensor. In particular, oil-filled hoses can be used in such configuration, which has the advantage that the assembly can be installed at large water depths, for example in excess of 1,000 m. Since two separate penetrators are provided for the first and second ports towards which the subsea cables are connected, an oil volume in the first subsea cable can be kept isolated from an oil volume of the second subsea cable. Accordingly, when one subsea cable is damaged so that water leaks into the subsea cable, the other subsea cable remains unaffected and operation of the subsea sensor can continue.

According to an embodiment, the first penetrator and/or the second penetrator comprise a penetrator body made of plastic material, for example polyetheretherketone (PEEK). Thus, the penetrator body may be produced cost efficient and may be easily integrated into the corresponding ports. Furthermore, a fluid tight through-connection of the first and second sensor connections from the subsea sensor may be easily accomplished.

According to an embodiment, the first penetrator is mounted in the first port by a screw connection between an outer thread of the first penetrator and an inner thread of the first port. Accordingly, the second penetrator may be mounted in the second port by a screw connection between an outer thread of the second penetrator and an inner thread of the second port. A sealing between the first penetrator and the first port may be provided by at least one O-ring seal, preferably by at least two O-ring seals. Accordingly, a sealing between the second penetrator and the second port may be provided by at least one O-ring seal, preferably by at least two O-ring seals. Thus, a reliable and easily practicable assembly of the connection assembly may be assured.

According to another embodiment, the first port and/or the second port provides a mechanical interface for the connection of a subsea cable, for example an oil-filled hose, in particular for the connection of an MKII fitting of an oil-filled hose. By providing a mechanical interface for the connection of an oil-filled hose, in particular a mechanical interface for the connection of the well-known MKII fitting, the connection assembly may be easily integrated into existing and new subsea constructions.

Furthermore, the connection assembly may comprise a first connection adapter mounted to the first port or mounted to the adapter piece and providing the first port. For example, the first connection adapter may provide a receptacle for receiving a connector provided at the duct to be coupled to the first port. In other words, the connection adapter may provide a mechanical interface for connecting a duct provided with a specific connector, for example an MKII fitting of an oil-filled hose. Other kinds of the first connection adapter may provide a mechanical interface for connecting to other connector types or for directly connecting to a subsea cable. This enables a support of a large variety of connection schemes. Likewise, the connection assembly may comprise a second connection adapter mounted to the second port or mounted to the adapter piece and providing the second port.

The first and/or second connection adapter may be sealed to the respective port via at least two O-ring seals. This may enable a reliable sealing between the first and/or second connection adapter and the respective first or second port.

The first and/or second connection adapter may be filled with dielectric liquid, in particular an oil. The first and/or second connection adapter may be filled with the same dielectric liquid as the duct connected to the corresponding first and second connection adapter, and a fluid connection between the dielectric liquid in the duct and the dielectric liquid in the corresponding first and second connection adapter may be provided. However, the first and second penetrators provide a separation between the interior space of the adapter piece and the dielectric liquid filling the duct and the corresponding first and second connection adapter.

According to another embodiment, the sensor port comprises a mechanical interface for mounting the adapter piece to a mounting flange or sensor housing of the subsea sensor.

For example, the subsea sensor is mounted to the mounting flange and the adapter piece is welded to the mounting flange.

In another example, the mechanical interface for mounting the adapter piece to the mounting flange or sensor housing of the subsea sensor comprises one, two or more O-ring seals for providing sealing between the adapter piece and the mounting flange or sensor housing.

In yet another example, the adapter piece is configured to be bolted to the sensor housing of the subsea sensor.

Thus, a fluid tight and pressure resistive connection between the mounting flange or sensor housing and the adapter piece may be provided.

According to an embodiment, the connection assembly comprises a barrier penetrator provided between an interior space of the subsea sensor and an interior space of the adapter piece. The interior space of the subsea sensor may be a space at a rear side of the subsea sensor within the mounting flange. The barrier penetrator may be arranged for example in the sensor port of the connection assembly, or in the sensor housing, or in the mounting flange of the subsea sensor. The barrier penetrator provides a liquid tight seal between the interior space of the subsea sensor and the interior space of the adapter piece. The barrier penetrator leads the first and second sensor connections from the subsea sensor to the interior space of the adapter piece and from there further through the first and second penetrators.

The configuration of this embodiment provides protection in case of double failures also. For example, when the first subsea cable is damaged so that water leaks into the first subsea cable and additionally the associated first penetrator breaks, the second subsea cable remains unaffected due to its associated second penetrator, and the subsea sensor as well as associated electronics remain unaffected due to the barrier penetrator.

The barrier penetrator may be made of a metal material.

The interior space of the adapter piece may be filled with dielectric fluid, for example with an oil, and maybe pressure compensated such that a pressure prevailing in an environment of the adapter piece is essentially present inside the interior space of the adapter piece. For accomplishing this, the adapter piece may provide a pressure compensator. Therefore, in subsea conditions, the pressure inside the interior space of the adapter piece may be in a range of some hundred bar, for example 300 bar in a depth of 3000 m.

The interior space of the subsea sensor may be filled with gas, for example with dried nitrogen. A pressure in the interior space of the subsea sensor may be kept constant at a value of less than 5 bar, in particular less than 1.5 bar, for example at 1 bar.

The barrier penetrator may be sealed to the sensor housing, the mounting flange, or the sensor port by a weld. By welding the barrier penetrator to the sensor housing, the mounting flange or the sensor port, a reliable sealing between the penetrator and the sensor housing, the mounting flange or the sensor port, respectively, may be achieved which may resist the above-described high pressure difference between a pressure in the interior space of the subsea sensor and a pressure in the interior space of the adapter piece.

In particular, the barrier penetrator may comprise a penetrator body having two or more through-holes for leading the first and second sensor connections through the barrier penetrator. The two or more through-holes may be filled with a glass material and may thus provide a glass-to-metal seal sealing the sensor connections within the through-holes of the barrier penetrator. The glass-to-metal seal provides a high resistance against the pressure difference between the pressure in the interior space of the adapter piece and the pressure in the interior space of the subsea sensor. Furthermore, the glass-to-metal seal electrically isolates the sensor connections from the metal penetrator body.

According to another embodiment, the adapter piece is extending along an axial direction and the sensor port is provided on an end face of the adapter piece. The end face is perpendicular to the axial direction. The first and second ports are provided on the lateral surface of the adapter piece. The lateral surface is substantially parallel to the axial direction. Thus, a plurality of ports may be arranged at the adapter piece. For example, the first port and the second port may be provided on substantially opposite lateral surfaces of the adapter piece. Additionally or as an alternative, the ports may be arranged in a row along the lateral surface of the adapter piece in the axial direction. Furthermore, the first port and the second port may be provided substantially at circumferential positions that are offset by 90 degrees.

According to an embodiment, the first sensor connection and/or the second sensor connection comprises at least two electrical conductors for data transmission and preferably furthermore at least two electrical conductors for power transmission. Thus, a redundant data transmission and a redundant power transmission can be provided.

According to another embodiment, a sensor assembly is provided. The sensor assembly comprises the dual output subsea sensor and a connection assembly as described above. The connection assembly is mounted to the subsea sensor. For example, the subsea sensor is mounted at the sensor port of the connection assembly.

According to an embodiment, the dual output subsea sensor comprises at least two pressure sensing elements and/or at least two temperature sensing elements. The outputs of the respective sensing elements are communicated on the first and second sensor connections. By providing at least two pressure sensing elements and two the temperature sensing elements, a completely independent and redundant pressure and temperature measurement and determination via two connected subsea cables is enabled.

According to another embodiment, a subsea cable harness is provided. The subsea cable harness comprises a first subsea cable including electrical conductors for providing a first sensor connection, a second subsea cable including electrical conductors for providing a second sensor connection, and a connection assembly as described above. The first subsea cable is connected, directly or indirectly, to the first port of the connection assembly, and the second cable is connected, directly or indirectly, to the second port of the connection assembly. The first penetrator leads electrical conductors of the first sensor connection through the first port into an interior space of the adapter piece. The second penetrator leads electrical conductors of the second sensor connection through the second port into the interior space of the adapter piece. An indirect connection between the first subsea cable or second subsea cable and the first port or second port, respectively, may be provided by the above described mechanical interface and/or the first and second connection adapters, respectively. Additionally, a fitting, for example an MKII fitting, may be provided for indirectly connecting the first and/or second subsea cable to the corresponding port.

The first subsea cable and/or the second subsea cable may comprise a corresponding oil-filled hose. Furthermore, the subsea cable harness may comprise the sensor assembly described above.

Thus, similar advantages as described above in connection with the connection assembly are achieved by the sensor assembly and the subsea cable harness.

Although specific features are described in the above summary and the following detailed description in connection with specific embodiments, it is to be understood that the features of the different embodiments of the invention can be combined with each other unless noted to the contrary.

In the following, example embodiments of the invention will be described in more detail. It is to be understood that the features of the various example embodiments described herein may be combined with each other unless specifically noted otherwise. Same reference signs in the various drawings refer to similar or identical components.

FIG. 1 shows a subsea cable harness 300 comprising a sensor assembly 200 connected to a first subsea cable 301 and a second subsea cable 302. The sensor assembly 200 comprises a subsea sensor 220 and a connection assembly 100. The subsea sensor 220 is mounted to a mounting flange 210 of the connection assembly 100.

The connection assembly 100 includes an adapter piece 110 that has a first port 111, a second port 112 and a sensor port 115. The adapter piece 110 is mounted to a rear part of the subsea sensor 220. For example, as shown in FIG. 1, the adapter piece 100 is mounted to the rear part of the subsea sensor 220 via the mounting flange 210. The mounting flange 210 may be coupled to a subsea flow line or subsea Christmas tree in which a pressure and temperature of a fluid therein is to be detected and monitored.

In the first port 111, a first penetrator 121 is provided and sealed. In the second port 112, a second penetrator 122 is provided and sealed.

The bodies of penetrators 121, 122 are made of a plastic material, in particular polyetheretherketone (PEEK). Sealing is done via one, preferably two O-ring seals. The adapter piece 110 is made of metal, in particular stainless steel. For example, the adapter piece 110 may provide in the first and second ports 111, 112 corresponding inner threads and the bodies of the penetrators 121, 122 may comprise corresponding outer threads. The penetrators 121, 122 may be mounted in the ports 111, 112 by screw connections between the corresponding inner and outer threads.

The first subsea cable 301 in form of an oil-filled hose is connected to the first port 111. It is to be noted that this connection can also be an indirect connection via a connection adapter. The second subsea cable 302 in form of an oil-filled hose is connected to the second port 112. It is to be noted that this connection can also be an indirect connection via a connection adapter.

The connection assembly 100 may, for example, comprise two such connection adapters that are mounted to the first and second ports, respectively, for providing a mechanical interface for mounting the respective subsea cable. In other configurations, such connection adapters may provide the first and/or second ports 111, 112, and the first and/or second penetrators 121, 122 may be provided in such connection adapters.

An oil filled hose has a flexible outer jacket that is filled with oil and in which respective lines are disposed, such as power lines or data lines. Due to the flexibility and the oil filling, the internal pressure in such hose is balanced to the outside water pressure while the liquid filling prevents a collapsing of the hose.

By way of the first and second penetrators 121, 122, it is ensured that the oil volumes of the two oil-filled hoses 301, 302 are kept separate and are kept separate from an interior space 105 of the adapter piece 110. Accordingly, if one hose leaks, the other hose and the interior space 105 of the adapter piece 110 are not affected.

The subsea sensor 220 is a dual output subsea sensor that gives out at least two measurements taken by two sensor elements. The sensor 220 may comprise two pressure sensor elements for two independent pressure measurements. The sensor 220 may comprise two temperature sensor elements for two independent temperature measurements. Preferably, it comprises both, two pressure sensor elements and two temperature sensor elements.

Processed or raw sensor readings are given out on the first sensor connection 131 for a first pressure sensor element and a first temperature sensor element, and on the second sensor connection 132 for a second pressure sensor element and a second temperature sensor element of subsea sensor 220. In other words, information concerning pressure and temperature detected at the sensor elements are output separately via corresponding sensor connections. For example, information concerning the pressure and temperature detected at the first pressure and temperature sensing elements may be output via the first sensor connection 131, and information concerning the pressure and temperature detected at the second pressure and temperature sensing elements may be output via the second sensor connection 132.

The first and second penetrators 121, 122 lead the first and second sensor connections 131, 132 from the interior space 105 of the adapter piece 110 into a duct that is in fluid communication with the interior of the respective oil-filled hose. The duct can be provided by the respective port, the above mentioned connection adapter, or the oil filled hose 301, 302—the duct is essentially a volume on the other side of the respective penetrator 121, 122 into which the respective sensor connection 131, 132 is led by the respective penetrator 121, 122.

Preferably, the first and second sensor connections 131, 132 each comprise two electrical data lines and two power lines for supplying electrical power to the respective sensor element(s). Each sensor connection 131, 132 may comprise for example one or more electrical wires.

In the example of FIG. 1, the adapter piece 110 is mounted to the mounting flange 210. The mounting flange 210 is mounted to the equipment at which the sensor reading is to be taken, for example a flow line in FIG. 1. The mounting flange 210 can form a part of the connection assembly 100.

In the example of FIG. 1, the adapter piece 110 is mounted to the mounting flange 210 via a weld 165.

A barrier penetrator 150 is provided at a connection between the adapter piece 110 and the mounting flange 210. The barrier penetrator 150 provides separation between a volume 221 at the rear side of the sensor 220 within the mounting flange 210, in which electronic cards for transmitting and/or processing sensor readings may for example be disposed, and the interior space 105 of the adapter piece 110. The barrier penetrator 150 may for example be mounted in the sensor port 115 of the adapter piece 110, or may be mounted in the mounting flange 210, as shown in FIG. 1. Accordingly, medium flow between the volumes 221, 105 is inhibited.

The interior space 105 of the adapter piece 110 may be filled with a gas, or may be filled with a liquid, such as a dielectric liquid. It may be maintained at a predefined internal pressure, such as about 1 bar. However, preferably the interior space 105 of the adapter piece 110 may be filled with a liquid and may be pressure compensated, for example via a pressure compensation element (not shown), so that its internal pressure is balanced to the outside pressure. In such embodiments, the pressure difference across the first and second penetrators 121, 122 can be kept low.

The barrier penetrator 150 preferably has a metal body with through holes, in which the sensor connections 131, 132 are sealed, preferably by a glass-to-metal seal. The barrier penetrator 150 is sealed in the opening in which it is mounted for example via a weld 151—see FIG. 2. A safe barrier can thus be provided.

Preferably, the sensor assembly 200 may be adapted to maintain a predefined pressure inside the volume 221 when installed subsea, for example a close to atmospheric pressure, e.g. a pressure below 5 bar or below 1.5 bar. For example, (not shown) electrical or electronic components for processing sensor data may be provided within the volume 221. Due to the predefined pressure, which may be much lower than ambient pressure in subsea conditions, the electrical or electronic components may be designed for these lower pressures and need not to be pressure resistant to high pressures in subsea environments.

Figure 2:
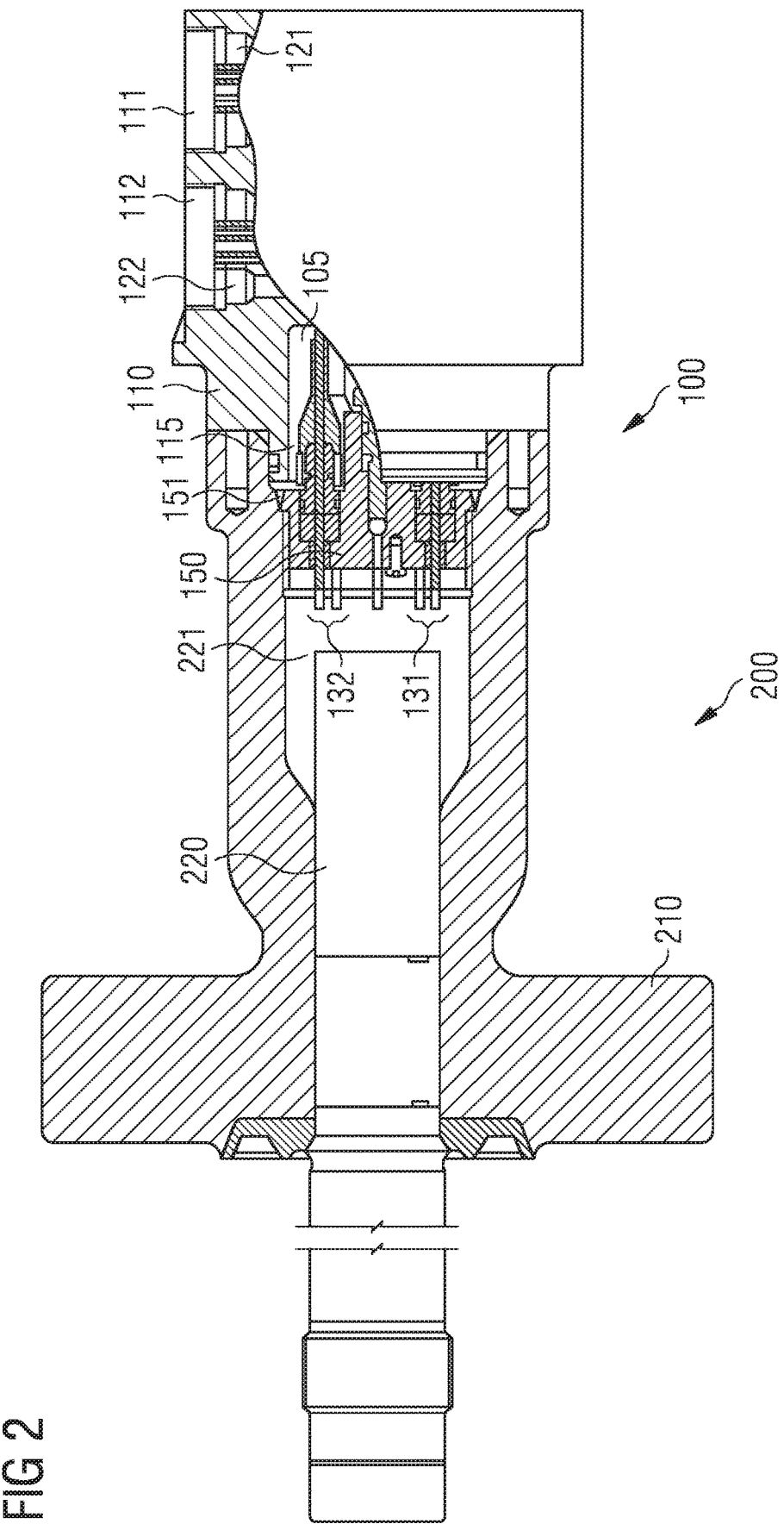
FIG. 2 shows a sectional side view of a sensor assembly according to an embodiment.

FIG. 2 illustrates a partly sectional view of a particular embodiment of the sensor assembly 200 including the connection assembly 100 of FIG. 1 so that the above explanations also apply to FIG. 2.

Figure 3:
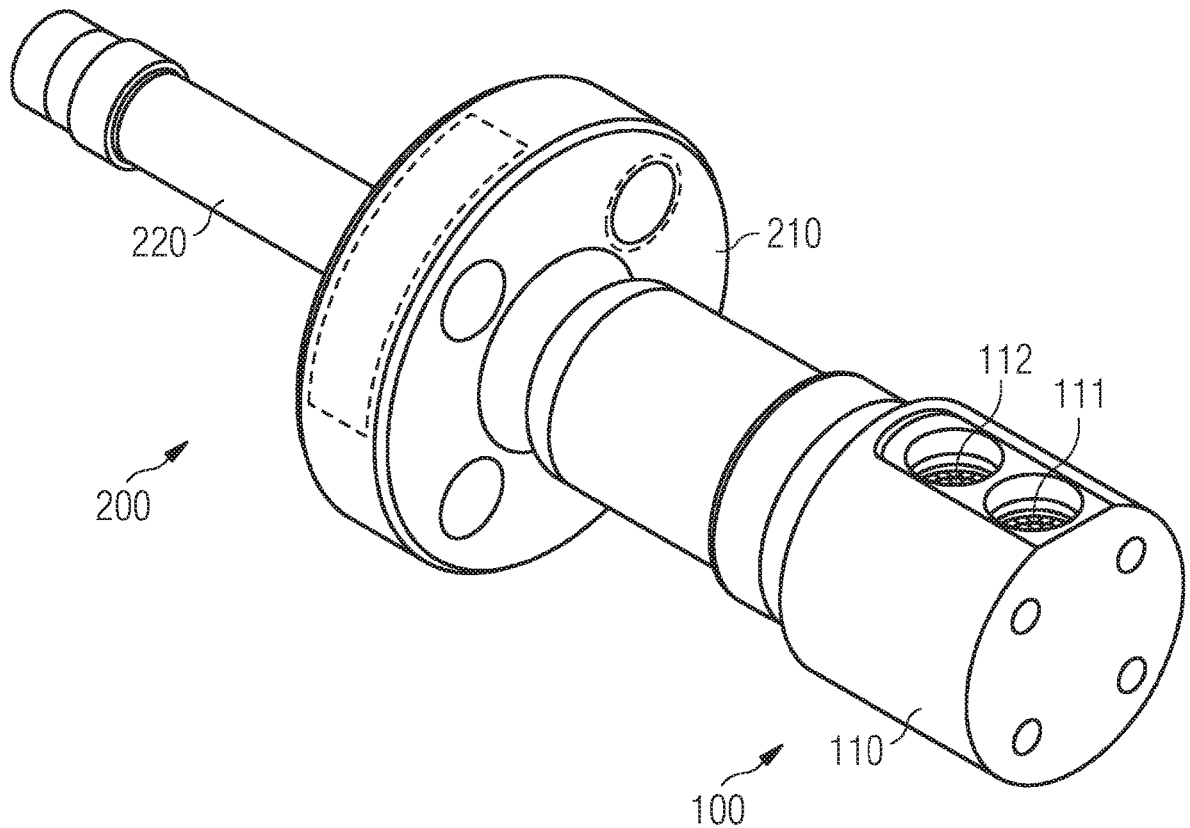
FIG. 3 shows a perspective view of a sensor assembly including a connection assembly according to an embodiment.

FIG. 3 shows a perspective view of the sensor assembly 200 including the connection assembly 100 of FIG. 2. The sensor assembly 200 including the connection assembly 100 can form part of embodiments of the subsea cable harness.

Figure 4:
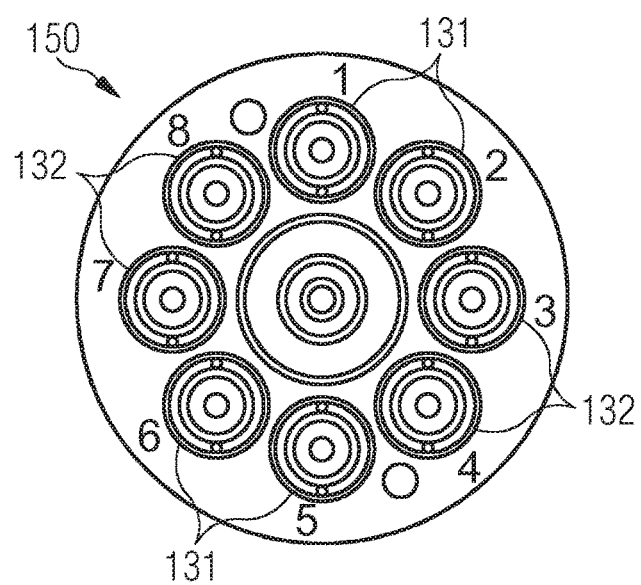
FIG. 4 shows a front view of a barrier penetrator that can be used in embodiments of the invention.

FIG. 4 shows a front view of the barrier penetrator 150 with example through-connections. The barrier penetrator 150 comprises a penetrator body having one or more through-holes for leading through-connections through the barrier penetrator 150. The penetrator body is made of metal. In the example shown in FIG. 4 the penetrator body has eight through-holes for leading through-connections 1 to 8 through the barrier penetrator 150.

Through-connections 1, 2 and 5, 6 may be assigned to the first sensor connection 131. Through-connections 3, 4 and 7, 8 may be assigned to the second sensor connection 132. For example, through-connections 1, 2 and 3, 4 may provide electrical power as part of the first and second sensor connections 131, 132, and connections 5, 6 and 7, 8 may provide data communication as part of the first and second sensor connections 131, 132. Data communication may for example occur via a differential serial bus, such as CAN (controller area network).

Each through-hole may be filled with a glass material and may thus be sealed by a glass-to-metal seal. In detail, a through-connection 1-8 extending through the corresponding through-hole is completely and continuously surrounded by the glass material. The glass material is also continuously in contact with an inner wall of the through-hole.

The glass-to-metal sealing of the through-connections in the through-holes 1-8 of the penetrator body provides a reliable sealing at high pressure differences. Further, the metal penetrator body may be welded to the sensor flange 210 or sensor port 115 thus providing a reliable sealing even at high pressure differences which may exist between the pressure compensated interior space 105 of the adapter piece 110 and the volume 221 having a much lower pressure, for example near one atmosphere.

Figure 5:
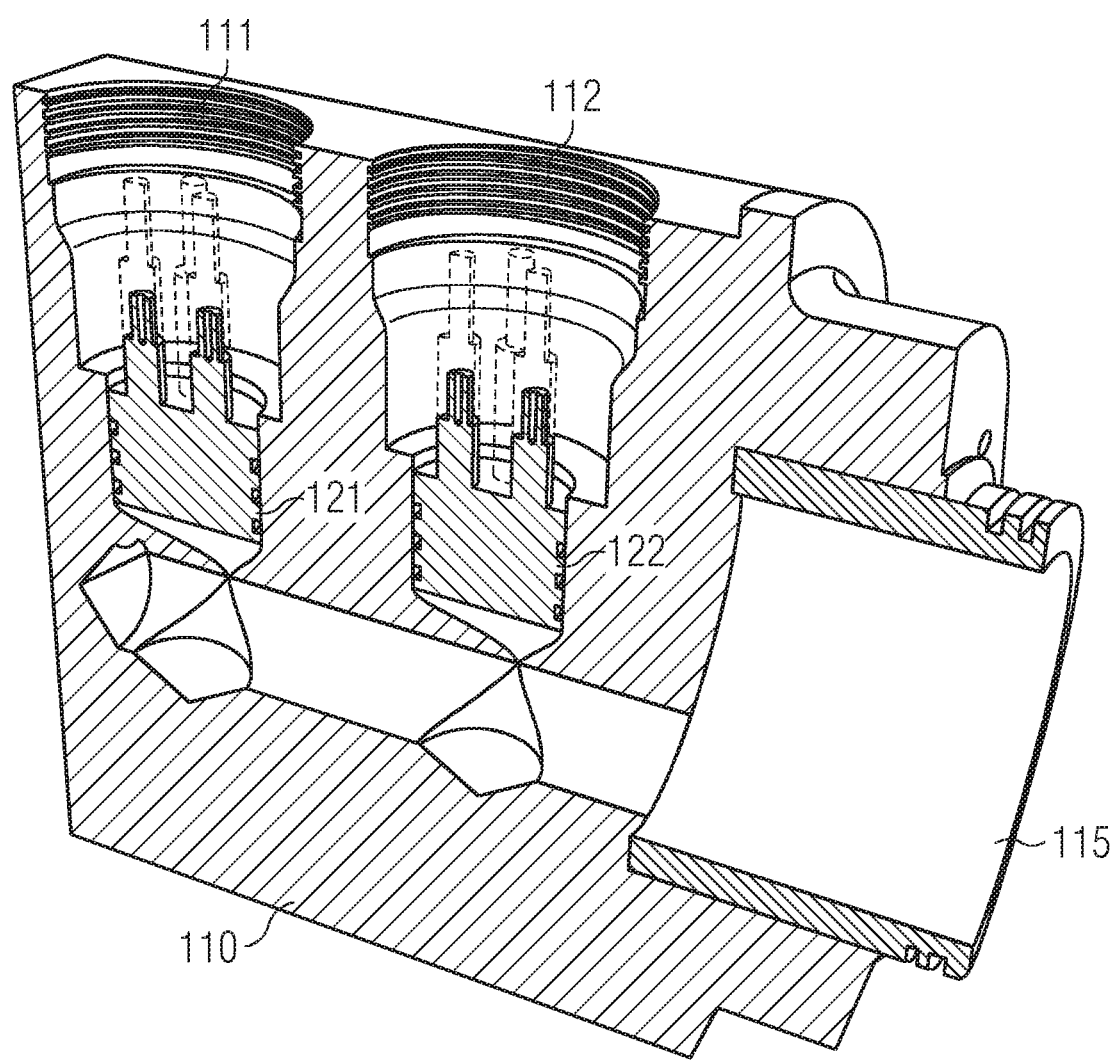
FIG. 5 shows a sectional perspective view of a connection assembly according to an embodiment.

FIG. 5 shows a partly sectional perspective view of the subsea connection assembly 100 of FIGS. 2 and 3.

While specific embodiments are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

The invention claimed is:

1. A connection assembly for connecting at least two subsea cables to a dual output subsea sensor, the connection assembly comprising:
    an adapter piece configured to be mounted to a rear part of the dual output subsea sensor, a sensor port being located in the adapter piece, through which at least a first sensor connection and a second sensor connection are connectable to the dual output subsea sensor;
    a first port for providing a connection to a first subsea cable of the at least two subsea cables;
    a second port for providing a connection to a second subsea cable of the at least two subsea cables;
    a first penetrator, arranged in the first port, to provide a liquid tight seal between an interior space of the adapter piece and a duct connectable to the first port, the first penetrator being configured to lead the first sensor connection through the first port; and
    a second penetrator, arranged in the second port, to provide a liquid tight seal between the interior space of the adapter piece and a duct connectable to the second port, and the second penetrator being configured to lead the second sensor connection through the second port, wherein the liquid tight seal provided by the first penetrator and by the second penetrator is configured to prevent fluid communication between the duct connectable to the first port and the duct connectable to the second port through the adapter piece.

2. The connection assembly of claim 1, wherein at least one of a body of the first penetrator and a body of the second penetrator is made from plastic material.

3. The connection assembly of claim 2, wherein the plastic material is polyetheretherketone.

4. The connection assembly of claim 2, wherein at least one of the first penetrator and the second penetrator is mounted in at least one of the first port and the second port, respectively, by a screw connection between an outer thread, on the respective one of the at least one of the first penetrator and the second penetrator, and an inner thread in the respective at least one of the first port and the second port.

5. The connection assembly of claim 1, wherein at least one of the first penetrator and the second penetrator is mounted in at least one of the first port and the second port, respectively, by a screw connection between an outer thread, on the respective one of the at least one of the first penetrator and the second penetrator, and an inner thread in the respective at least one of the first port and the second port.

6. A sensor assembly, comprising:
    the dual output subsea sensor; and
    the connection assembly of claim 5, wherein the connection assembly is mounted to the dual output subsea sensor.

7. The sensor assembly of claim 6, wherein the dual output subsea sensor comprises at least one of
    at least two pressure sensing elements and
    at least two temperature sensing elements, an output of respective one of the at least one of at least two pressure sensing elements and at least two temperature sensing elements, being communicated on the respective first and second sensor connections.

8. A subsea cable harness comprising
    a first subsea cable including electrical conductors to provide a first sensor connection;
    a second subsea cable including electrical conductors to provide a second sensor connection; and
    the connection assembly of claim 5,
    wherein the first subsea cable is connectable to the first port of the connection assembly and the second subsea cable is connectable to the second port of the connection assembly,
    wherein the first penetrator is configured to lead electrical conductors of the first sensor connection through the first port, and
    wherein the second penetrator is configured to lead electrical conductors of the second sensor connection through the second port, into an interior space of the adapter piece.

9. The connection assembly of claim 1, wherein the liquid tight seal at least one of between the first penetrator and the first port and between the second penetrator and the second port is provided by at least one O-ring seal.

10. The connection assembly of claim 9, wherein the liquid tight seal at least one of between the first penetrator and the first port and between the second penetrator and the second port is provided by at least two O-ring seals.

11. The connection assembly of claim 1, wherein at least one of the first port and the second port is configured to provide a mechanical interface for providing a connection to an MKII fitting of a corresponding at least one of the first subsea cable and the second subsea cable.

12. The connection assembly of claim 1, further comprising a first connection adapter, mounted to the first port or the adapter piece, to provide the connection to the first subsea cable.

13. The connection assembly of claim 12, wherein the first connection adapter comprises a mechanical interface to provide connection to an MKII fitting of the corresponding first subsea cable.

14. The connection assembly of claim 12, further comprising a second connection adapter, mounted to the second port or the adapter piece, to provide the connection to the second subsea cable.

15. The connection assembly of claim 1, further comprising a second connection adapter, mounted to the second port or the adapter piece, to provide the connection to the second subsea cable.

16. The connection assembly of claim 15, wherein the second connection adapter comprises a mechanical interface to provide connection to an MKII fitting of the corresponding second subsea cable.

17. The connection assembly of claim 1, further comprising a barrier penetrator, provided between an interior space of the dual output subsea sensor and an interior space in the adapter piece, the barrier penetrator being configured to provide a liquid tight seal between the interior space of the subsea sensor and the interior space in the adapter piece, wherein the barrier penetrator is configured to lead the first and second sensor connections into the dual output subsea sensor.

18. The connection assembly of claim 17, wherein the barrier penetrator is configured to be sealed in a sensor housing of the dual output subsea sensor, in a mounting flange or in the sensor port by a weld.

19. The connection assembly of claim 18, wherein the barrier penetrator comprises a penetrator body including two or more through-holes, through which the first and second sensor connections are connectable through the barrier penetrator, wherein the two or more through-holes are filled with a glass material and are sealed by a glass-to-metal seal.

20. The connection assembly of claim 17, wherein the barrier penetrator comprises a penetrator body including two or more through-holes, through which the first and second sensor connections are connectable through the barrier penetrator, wherein the two or more through-holes are filled with a glass material and are sealed by a glass-to-metal seal.

21. A sensor assembly, comprising:
the dual output subsea sensor; and
the connection assembly of claim 17, wherein the connection assembly is mounted to the dual output subsea sensor.

22. The sensor assembly of claim 21, wherein the dual output subsea sensor comprises at least one of
at least two pressure sensing elements and
at least two temperature sensing elements, an output of respective one of the at least one of at least two pressure sensing elements and at least two temperature sensing elements, being communicated on the respective first and second sensor connections.

23. A subsea cable harness comprising
a first subsea cable including electrical conductors to provide a first sensor connection;
a second subsea cable including electrical conductors to provide a second sensor connection; and
the connection assembly of claim 17,
wherein the first subsea cable is connectable to the first port of the connection assembly and the second subsea cable is connectable to the second port of the connection assembly,
wherein the first penetrator is configured to lead electrical conductors of the first sensor connection through the first port, and
wherein the second penetrator is configured to lead electrical conductors of the second sensor connection through the second port, into an interior space of the adapter piece.

24. The connection assembly of claim 1, wherein the sensor port comprises a mechanical interface to mount the adapter piece to a sensor housing of the dual port subsea sensor, wherein the mechanical interface comprises one, two or more O-ring seals to provide sealing between the adapter piece and the sensor housing.

25. The connection assembly of claim 1, wherein the adapter piece is configured to be bolted to a sensor housing of the subsea sensor.

26. The connection assembly of claim 1, wherein the adapter piece includes a cylindrical shape with an axial direction, wherein the sensor port is provided on one of two end faces of the cylindrical shape, and wherein the first and second ports are provided on a lateral surface of the cylindrical shape.

27. The connection assembly of claim 26, wherein the first port and the second port are provided at substantially same circumferential positions, at circumferential positions offset by 90 degrees, or at substantially opposite circumferential positions of the cylindrical shape.

28. The connection assembly of claim 1, wherein at least one of the first sensor connection and the second sensor connection includes at least two electrical conductors for data transmission, and further comprises two electrical conductors for power transmission.

29. A sensor assembly, comprising:
the dual output subsea sensor; and
the connection assembly of claim 1, wherein the connection assembly is mounted to the dual output subsea sensor.

30. The sensor assembly of claim 29, wherein the dual output subsea sensor comprises at least one of
at least two pressure sensing elements and
at least two temperature sensing elements, an output of respective one of the at least one of at least two pressure sensing elements and at least two temperature sensing elements, being communicated on the respective first and second sensor connections.

31. A subsea cable harness comprising
a first subsea cable including electrical conductors to provide a first sensor connection;
a second subsea cable including electrical conductors to provide a second sensor connection; and
the connection assembly of claim 1,
wherein the first subsea cable is connectable to the first port of the connection assembly and the second subsea cable is connectable to the second port of the connection assembly,
wherein the first penetrator is configured to lead electrical conductors of the first sensor connection through the first port, and
wherein the second penetrator is configured to lead electrical conductors of the second sensor connection through the second port, into an interior space of the adapter piece.

32. The subsea cable harness of claim 31, wherein at least one of the first subsea cable and the second subsea cable is an oil-filled hose.

33. The subsea cable harness of claim 31, further comprising a sensor assembly comprising:
the dual output subsea sensor; and
the connection assembly, wherein the connection assembly is mounted to the dual output subsea sensor.

* * * * *